June 7, 1966 B. HOWARD 3,255,314

TAPE PRINTER AND PERFORATOR WITH READER

Filed June 20, 1962 12 Sheets-Sheet 1

INVENTOR.
BERNARD HOWARD

BY James and Franklin

ATTORNEYS

June 7, 1966 B. HOWARD 3,255,314

TAPE PRINTER AND PERFORATOR WITH READER

Filed June 20, 1962 12 Sheets-Sheet 2

INVENTOR.
BERNARD HOWARD

BY James and Franklin

ATTORNEYS

INVENTOR.
BERNARD HOWARD
BY James and Franklin
ATTORNEYS

June 7, 1966 B. HOWARD 3,255,314

TAPE PRINTER AND PERFORATOR WITH READER

Filed June 20, 1962 12 Sheets-Sheet 4

INVENTOR.
BERNARD HOWARD
BY James and Franklin
ATTORNEYS

June 7, 1966 B. HOWARD 3,255,314

TAPE PRINTER AND PERFORATOR WITH READER

Filed June 20, 1962 12 Sheets-Sheet 5

INVENTOR.
BERNARD HOWARD

BY James and Franklin
ATTORNEYS

June 7, 1966 B. HOWARD 3,255,314

TAPE PRINTER AND PERFORATOR WITH READER

Filed June 20, 1962 12 Sheets-Sheet 6

INVENTOR.
BERNARD HOWARD

BY James and Franklin

ATTORNEYS

TAPE PRINTER AND PERFORATOR WITH READER

Filed June 20, 1962 12 Sheets-Sheet 7

INVENTOR.
BERNARD HOWARD

BY James and Franklin

ATTORNEYS

June 7, 1966 B. HOWARD 3,255,314

TAPE PRINTER AND PERFORATOR WITH READER

Filed June 20, 1962 12 Sheets-Sheet 8

INVENTOR.
BERNARD HOWARD

BY James and Franklin

ATTORNEYS

INVENTOR.
BERNARD HOWARD
BY James and Franklin
ATTORNEYS

INVENTOR
BERNARD HOWARD

BY James and Franklin

ATTORNEYS

INVENTOR.
BERNARD HOWARD
BY James and Franklin
ATTORNEYS

TAPE PRINTER AND PERFORATOR WITH READER

Filed June 20, 1962 12 Sheets-Sheet 12

INVENTOR.
BERNARD HOWARD

BY James and Franklin

ATTORNEYS

United States Patent Office 3,255,314

Patented June 7, 1966

3,255,314

TAPE PRINTER AND PERFORATOR WITH READER

Bernard Howard, Upper Saddle River, N.J., assignor to Mite Corporation, New Haven, Conn., a corporation of Delaware Filed June 20, 1962, Ser. No. 203,785
18 Claims. (Cl. 178—92)

This invention relates to a tape printer, perforator and reader, particularly for accurate transmission.

Accuracy is obtained by preliminary display of a message, followed by regeneration of the message with correction of errors, and subsequent transmission of the corrected message. One object of the present invention is to generally improve the apparatus disclosed in my U.S. Patent 3,022,376 issued Feb. 20, 1962 and entitled "Display Transmitter."

In the said patent a tape is ink printed with conventional characters and code dots. One change in the present improvement is that the code dots are made in the form of perforations rather than printed dots. Some of the invention centers about the improved mechanism of the perforator, which operates by a toggle action and therefore is quiet, instead of requiring an impact with consequent vibration and noise.

In accordance with a further feature and object of the invention, the conventional characters are printed between perforations instead of near one edge of the tape, thus permitting the use of a narrower tape. Further objects of the invention center about the printing mechanism, and include the provision of detent wheels for centering a type body axially as well as rotatably. The printing mechanism is compact, with its type cylinder reciprocated transversely of the tape so that the printed characters may be positioned as closely as possible to the code perforations corrseponding thereto.

A further feature is that the characters are exposed and visible immediately following the perforator.

A compact and efficient telegraph printer which employs a pulley and cable system for selection of the type characters has been developed, and is disclosed in my prior Patent 2,942,065 issued June 21, 1960 and entitled "Telegraph Printer." One object of the present invention is to employ the multiple cam shaft and sequence shaft and special function mechanism of the said printer thus making it easier to manufacture and service the new equipment, using much the same spare parts, which is of particular importance in military applications.

Another object of the invention is to adapt the same to accept any of several different tape widths. This again is of importance in military work because tape of one width may be available, but not another.

Still another object is to combine the present device with an associated page printer to locally print a copy of the outgoing messages for record purposes. The apparatus may function as an "ASR" or automatic-send-receive unit.

Conveniently accessible and easily operated switches are mounted at the front of the apparatus for providing any of a considerable number of combinations of operations. It is thus possible to perforate the tape from the keyboard; to perforate the tape from an incoming line; to machine read and regenerate or reperforate; to machine read and transmit a single message or a continuous series of messages; to provide a page print copy if desired; to perforate from the keyboard and then machine read and transmit either with or without correction, as desired; and to perforate from an incoming line and then machine read and transmit, with or without correction, as desired.

Further objects of the invention center about the ink ribbon feed for the printer. This is not claimed herein, it being disclosed in greater detail and claimed in my companion application filed on June 20, 1962, under Ser. No. 203,768, now Patent No. 3,184,027, issued on May 18, 1965.

Further features of the invention center about the machine reader, including also the manual marking of an error, and the machine detection of such error mark. This mechanism is disclosed in greater detail and claimed in my copending companion application filed on June 20, 1962, under Ser. No. 203;778.

To accomplish the foregoing objects, and such other objects as may hereinafter appear, the invention resides in the tape printer and perforator elements and their relation one to another, as are hereinafter more particularly described in the following specification. The specification is accompanied by drawings in which.

Figures 4, 5:
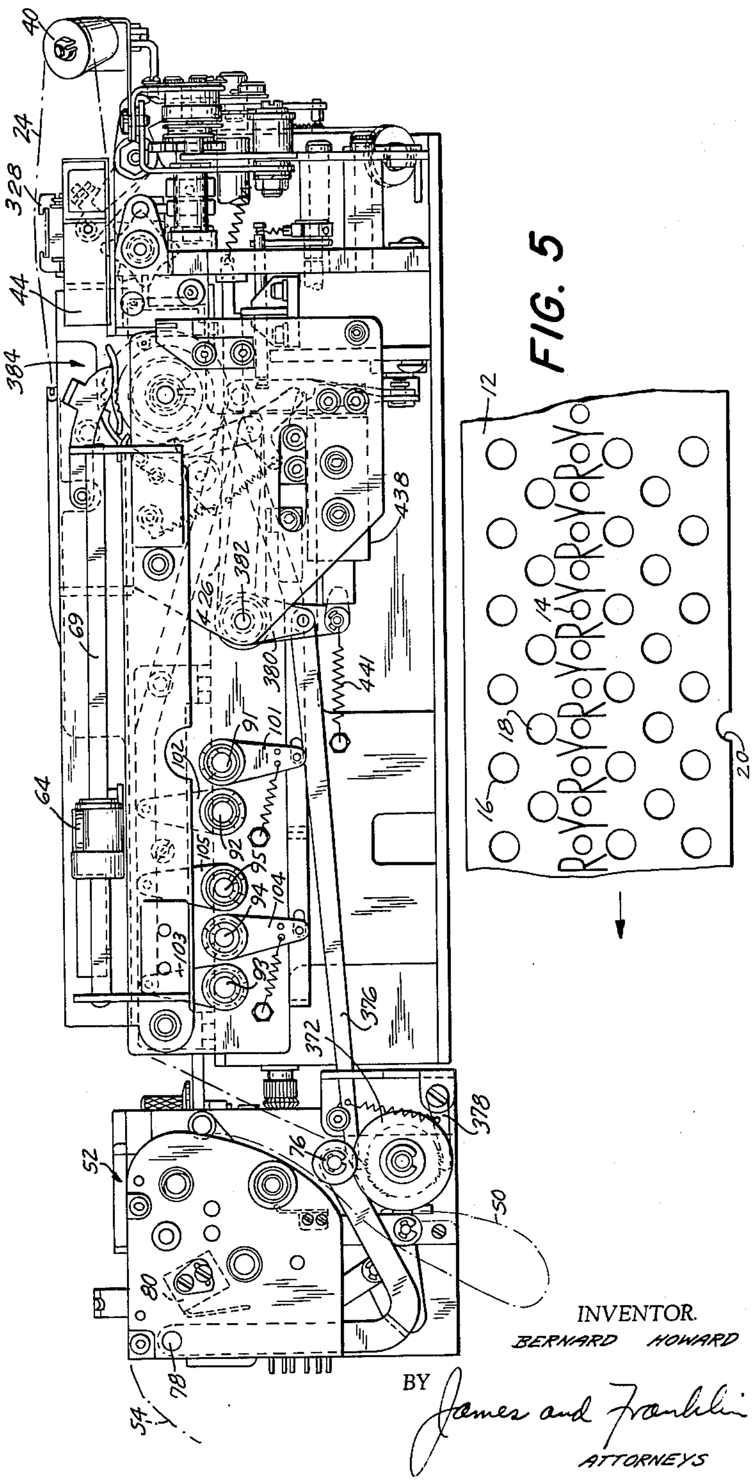
FIG. 4 is a front elevation of the mechanism shown in FIG. 3.
FIG. 5 shows a piece of perforated tape carrying the "R–Y" test pattern.

Referring now to the drawing, and more particularly to FIG. 5, the tape 12 has a row of small perforations 14 which cooperate with a sprocket wheel for step-by-step feed of the tape. The conventional characters are printed between these perforations, as is here indicated by the letters "RYRY," etc. The present device uses a five-level or five-unit code, and the perforations for the letter "Y"

are the three superposed perforations indicated at 16, while the perforations for the letter "R" are the two superposed perforations indicated at 18. The printed character necessarily is displaced from its own code perforations because of the physical displacement needed between the printing mechanism and the perforating mechanism. In the present machine this displacement is minimized and corresponds to the spacing of six and one-half letters. FIG. 5 also shows an error notch at 20.

Figures 1, 1A, 2:
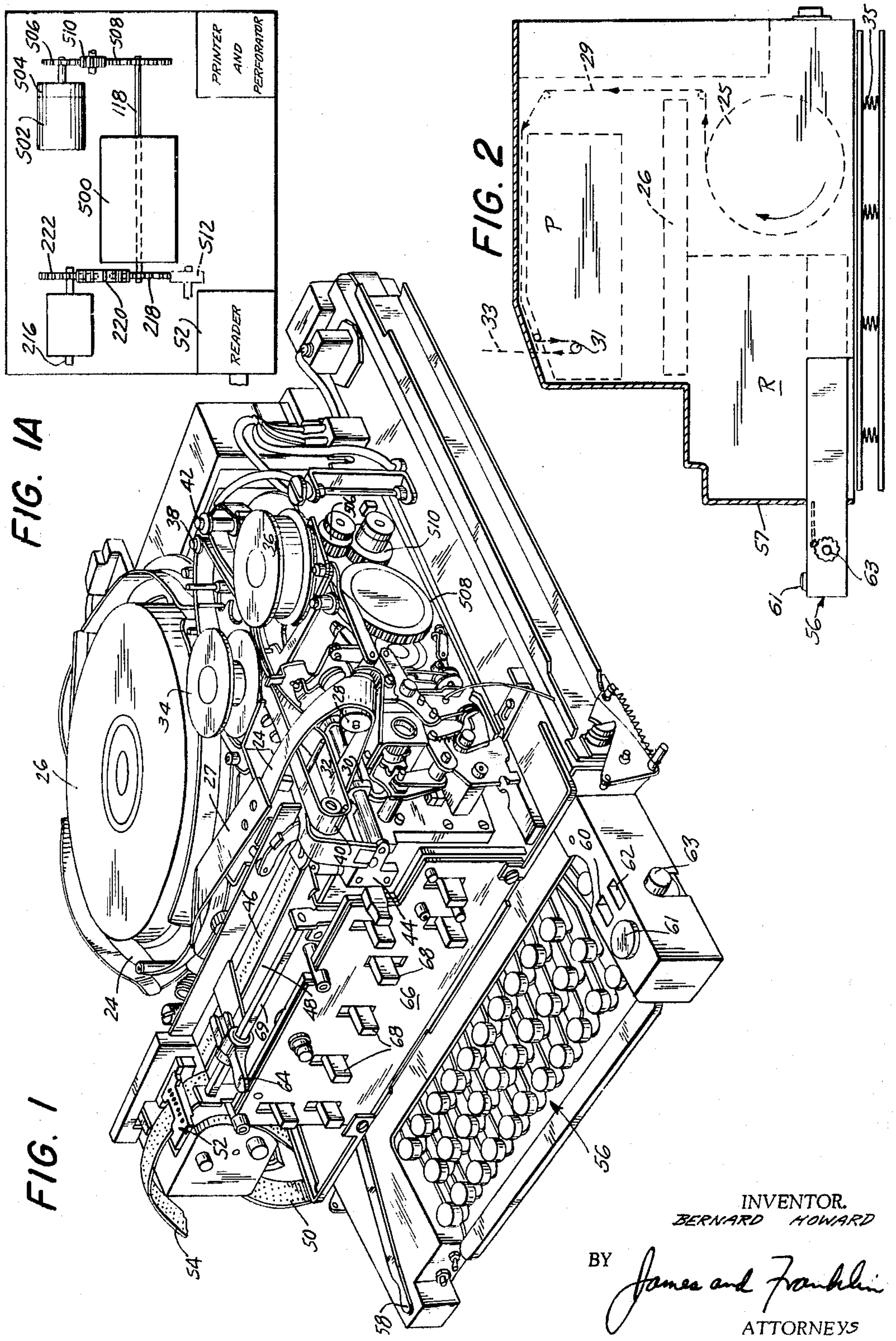
FIG. 1 is a perspective view showing a preferred form of tape printer, perforator and reader embodying features of the invention, the cover being removed.
FIG. 1A is a schematic plan view in block form.
FIG. 2 is a schematic transverse section, with a page printer combined over the tape machine.

Referring now to FIG. 1 of the drawing, a paper tape 24 is supplied from a large tape roll 26 disposed horizontally over the rear part of the apparatus. The tape is guided through a channel 27 and around an angularly disposed direction-changing idler 28 and thence over a type cylinder indicated at 30. The ink ribbon 32 extends transversely of the paper tape. The ink ribbon is supplied from a conventional typewriter spool 34, and is wound up on another conventional typewriter spool 36, or vice-versa. The spools are turned by ratchet feed mechanism which is not conventional. The ink ribbon is guided around roller 38, thence far forward to a roller at 40, and then rearward to roller 42. A print hammer (not shown) is located betwen the forward and rearward passes of the ink ribbon and serves to strike the lower ribbon downward against the paper tape and the type cylinder 30 therebeneath.

The paper tape next passes through a perforator indicated generally at 44. A length of the printed and perforated tape then is displayed, as shown at 46, over a support or table 48. The tape then extends downward and reversely upward to provide a slack loop of tape, indicated at 50. After passing around a tight-tape sensing roller, the tape enters the tape reader, indicated at 52, where the code perforations are machine read. The tape leaves the machine at 54.

FIG. 1 also shows the manually operable keyboard, generally designated 56. This may be slid back beneath the main body of the apparatus, and for this purpose a release lever 58 is moved sideward to unlock the keyboard, thereby freeing it. FIG. 2 shows the forward position. In rearward position it is within the plane of wall 57.

The keyboard section preferably includes two counters, the digit wheels of which are visible at 60 and 62 (FIG. 1). One of these is a counter to indicate the number of characters transmitted before signalling carriage return. The counter then goes back to zero. This is important to an operator working with tape when transmitting to a station having a page print receiver, in order to help the operator break the message into lengths corresponding to single lines. The other window exposes digit wheels which may be preset by a knob 63 to warn or signal the operator when a desired number of characters for a single line have been transmitted, the signal in this case being a lamp 61 which is lighted at the end of a line of desired length.

The switch panel 66 is provided with a considerable number of switches having handles 68 which may be moved to two positions. By appropriately operating tthese different switches in combination, the machine may be made to perform any one of a desired number of combinations of operations, as mentioned above.

After printing an exposed length of tape, the operator may read the same to discover an error. On discovering an error, an error marking device 64 may be slid along its guide rod 69 until its pointer reaches the error, whereupon the handle 64 is depressed. The device then functions to put an error perforation through one edge of the tape to notch the edge. With a wider tape it is a hole instead of a notch.

Subsequently if the machine is set for regeneration, the signal is reperforated and reprinted on the tape, without transmission to an outgoing line, and in such case the tape is automatically stopped when the error mark or notch is reached, thus affording the operator an opportunity to correct the error manually, whereupon the operation is resumed. The corrected length of tape is then displayed and examined, and if correct, may be transmitted on the outgoing line.

Figure 3:
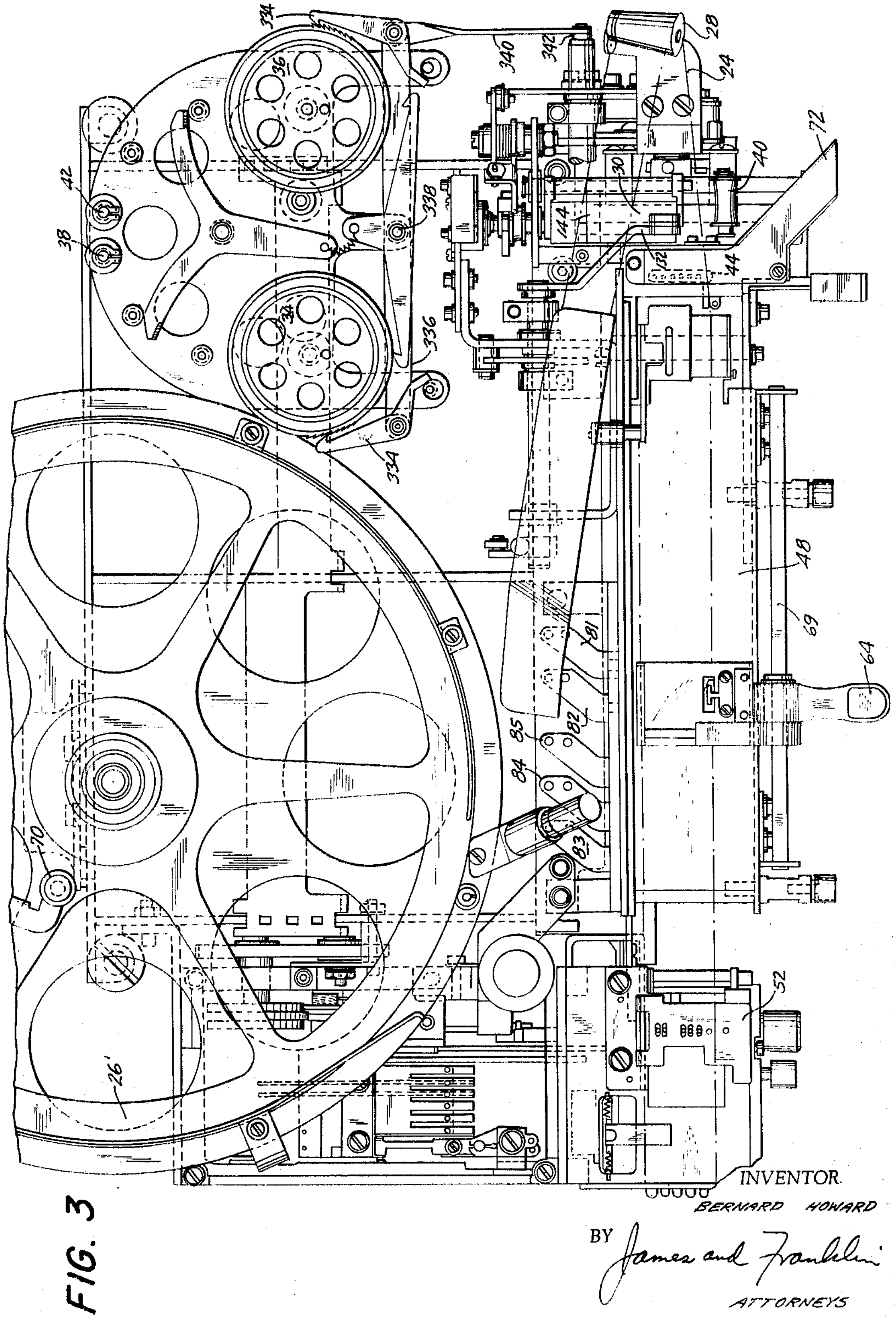
FIG. 3 is a plan view drawn to larger scale of a part of the mechanism shown in FIG. 1, without the keyboard and front switch panel.

Some of the foregoing mechanism is shown to larger scale and in greater detail in FIGS. 3 and 4 of the drawing. Similar reference characters apply, except that in FIG. 3 the numeral 26' refers to the support for the paper roll rather than the paper roll itself. One end of a low tape sensor is indicated at 70, this providing a signal when a new paper roll is needed. FIG. 3 also shows a chute 72 for the discharge of chad from the perforator 44. FIG. 4 shows the slack loop 50 employed ahead of the reader 52 and the tight-tape sensor 76 which is pivoted at 78 to operate a switch 80 in the event the slack loop is used up.

In Patent 2,942,065 a multiple cam shaft carries clutches and cams for selectively operating five cam follower arms which carry pulleys which operate on cables for axial and rotary selection of a type character on a cylindrical type body. (A sixth pulley is operated as a special function.) Similar mechanism is employed here, but in addition each arm operates not only a pulley, but also an angle lever for control of an appropriate perforator punch. The five angle levers here referred to are indicated at 81–85 in FIG. 3. These angle levers oscillate five shafts indicated in FIG. 4 at 91–95. These shafts in turn oscillate five arms indicated at 101–105. The ends of these arms are connected to long bars which extend generally horizontally to the perforator 44, where they act as selector interposesrs to make one or more of the punches operative.

Figure 6:
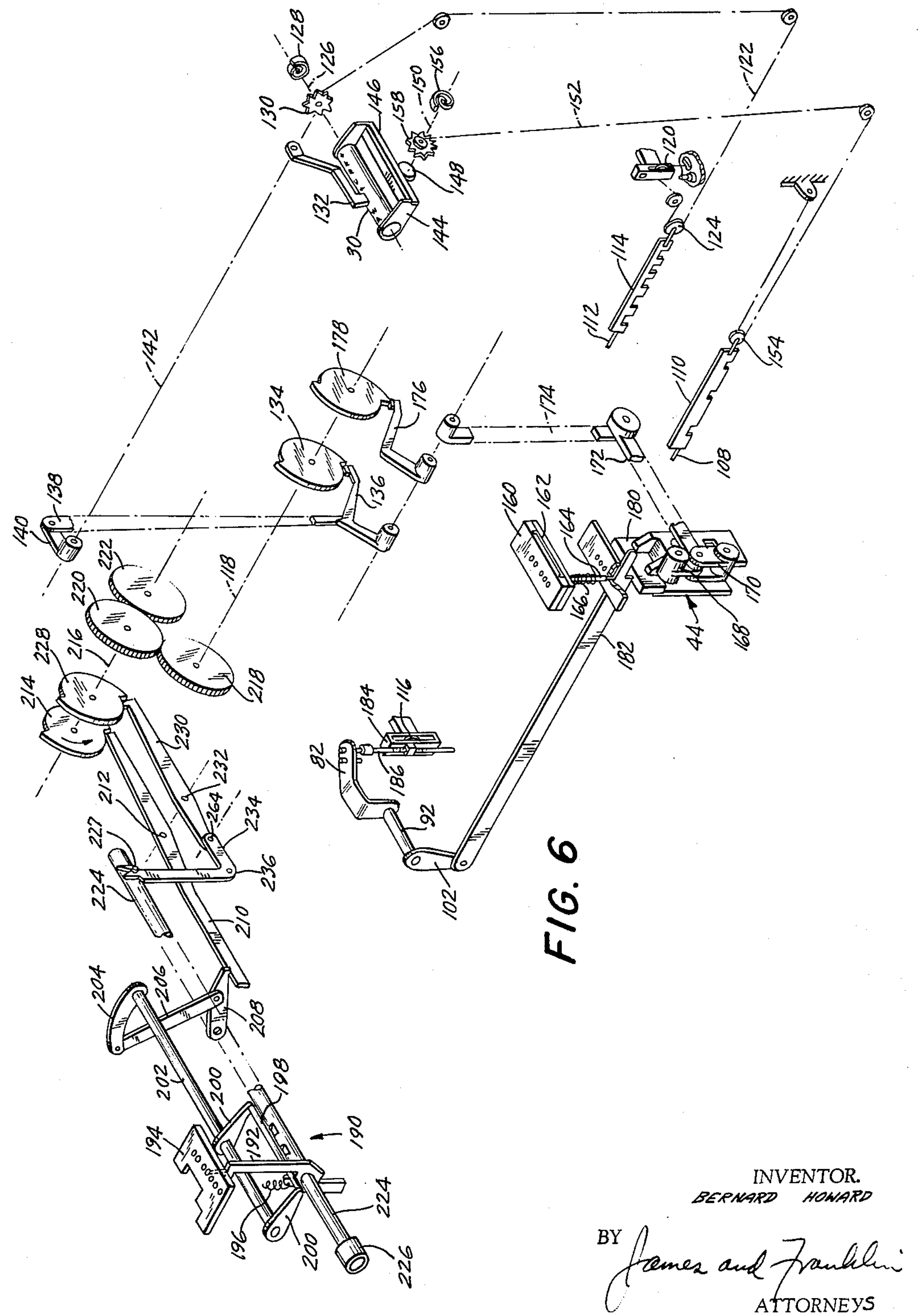
FIG. 6 is an exploded schematic perspective view explanatory of some of the mechanism shown in the preceding figures.

Reference now may be made to FIG. 6. The cable end 108 and notched slide 110 correspond in the aforesaid Patent 2,942,065 to the pulley-operated selector cable numbered 42 there and function slide 38 there. This provides axial movement of the type cylinder. The parts numbered 112 and 114 correspond to the pulley operated selector cable 108 of that patent and function slide 106 there. A vertical movable pulley indicated at 116 is typical of five such pulleys moved by cam follower arms, the cams and cam clutches of which are mounted on a motor driven shaft suggested at 118. Three pulleys like the pulley 116 operate on cable 108, and one has a motion double that of another, thus providing eight positions of the type cylinder in axial direction. Two pulleys like the pulley 116 operate on the cable 112, providing an eighth and also a quarter rotation of the type cylinder, and a third pulley is indicated at 120, this corresponding to a half rotation of the type cylinder. This causes a change from letters to figures, which change may be provided as one of a number of so-called "special functions" controlled by the relative positioning of the notched slides 110 and 114, all as is explained in Patent 2,942,065.

A cable 122 is coupled to slide 114 by pulley 124, and also is operated on by selector pulley 120. The cable 122 is wound about and turns a splined or keyed shaft suggested at 126, and serves to turn that shaft and consequently the type cylinder 30. The cable works against a restoring spring 128. The shaft preferably carries a detent wheel 130 which helps fix the position of the type cylinder at the instant of printing.

The print hammer is indicated at 132 and is operated by mechanism schematically represented as follows: There is a cam 134 and associated clutch (not shown) on shaft 128. The cam operates a cam follower arm 136, which in turn is connected through a link 138 to an arm 140 which turns a shaft 142, which in turn operates the hammer 132 when the cam drop is reached. The actual mechanism is more complex and is described later.

The type cylinder 30 is moved axially by a yoke 144 carrying a gear rack 146 meshing with a gear 148 on a shaft 150. This is turned by a cable 152 which is connected to the notched slide 110 by a coupling pulley 154. The cable works against a restoring spring 156. In Patent 2,942,065 the cable 152 is connected directly to the yoke 144 to provide axial movement, but in the present mechanism the interposition of a rotatable gear 148 and gear rack 146 has the advantage of facilitating the use of a rotary detent wheel 158 which helps fix or center the position of the characters when the type cylinder 30 is moved axially. This isolates the type cylinder from the vibration of the detent mechanism. In this schematic diagram the paper tape and ink ribbon have been omitted.

The perforator is indicated at 44. Its stationary die is shown at 160, the paper tape passing through a tape slot 162. There is a line of punches, only one of which is indicated at 164. It is normally retracted by a compression spring 166.

The punches are moved upward by a toggle mechanism, the toggle arms of which are shown at 168, 170. The toggle arms are moved by a link 172 connected to an arm 174 operated by a cam follower 176 driven by a cam 178. This cam again has a clutch, and both cam and clutch are mounted on shaft 118. The toggle mechanism causes vertical movement of a shuttle interposer 180, the purpose of which is explained later.

The shuttle 180 underlies and attempts to operate all of the punches. However, it does not do so unless the large end of a selector interposer 182 is moved between the shuttle 180 and the lower end of the punch 164. It will be recalled that there are five vertically movable pulleys 116 which operate on the two cables, and that these also operate five angle levers. One example is shown in FIG. 6, the pulley block 184 carrying a threaded adjustable pin 186 bearing against the end of angle arm 82. This is connected to pivot 92 carrying arm 102 connected to selector interposer 182. There are five such mechanisms which selectively make one or more of the five main punches operable. There is a sixth additional punch of smaller diameter which operates at every stroke in order to provide uniformly spaced feed or sprocket holes for subsequent use.

The tape reader is indicated generally at 190. It comprises a row of vertically movable sensors, only one of which is indicated at 192. Its upper end carries a pin slidable through one of the holes in a tape guide 194, which encloses the tape in order to support the same. There are seven holes, five of which are for the code perforations. The remaining two holes at the left are for error indication, one being used when the tape is narrow, and the other when the tape is wide, if edge notches are wanted rather than perforations. The sensors are urged upward by individual small pull springs 196. They are held in down position by a retractor rod 198 carried by arms 200 rocked by a shaft 202. This is rocked by an arm 204 and link 206 connected to an arm 208 controlled by a lever 210 pivoted at 212 and operated by a cam 214. This cam and its clutch are mounted on a shaft 216 geared to main shaft 118 by means of gears 218, 220 and 222.

The tape reader additionally employs sprocket feed mechanism, not here shown, and the timing of the parts is such that when the tape dwells with its perforations in registration, the cam 214 permits the right end of lever 210 to rise, whereupon the left end and the arm 208 fall, thereby causing arms 200 to rise, permitting the sensors to rise where there is a tape perforation.

The rise of the senors is also controlled by a slotted rod 224 which may be turned to any of four positions by a control knob 226. One of these positions is used to transmit an "RY" test signal, for which purpose the rod 224 is reciprocated axially. This is accomplished by a cam 228 on shaft 216, the said cam operating a lever 230 pivoted at 232 and connected to an angle lever 234 pivoted at 236. The upper end of the angle lever has an open fork connected to rod 224 at a pin 227, when rod 224 is in the "RY" position.

Referring to FIG. 1A, the box 500 represents the selector of Patent 2,942,065 and has its main cam shaft 118 continuously driven by a motor 502 with built in reduction gearing at 504, connected to shaft 118 through a pinion 506 and a gear 508 with an idler 510 therebetween. Motor 502 is a synchronous motor, and pinion 506 may be removed and replaced to provide operating speeds of 60, 66, 75 and 100 words per minute. The change in diameter of pinion 506 is accommodated by moving the center position of idler 510. These gears are also shown in FIG. 1.

Main shaft 118 is geared to the cam shaft 216 of the reader 52 by means of gears 218, 220, and 222. The printer perforator is driven from the special function shaft (not shown) of the selector 500. The keyboard (shown in FIG. 1 but not FIG. 1A) also has a cam shaft, as is fully described in my Patent 2,977,413 issued Mar. 28, 1961. The said shaft is driven from the gear 218, and for this purpose the keyboard has a gear 512 which moves into mesh beneath gear 218 when the keyboard is pulled to its forward or operating position. Gear 512 is disengaged from gear 218 when the keyboard is slid back to inoperative position.

Referring to FIG. 2 of the drawing, the printer, perforator and reader mechanism is housed in the area marked R. The keyboard 56 may be pulled out, as shown, but when pushed rearward it is located beneath the region R. The narrow tape roll is located at 26. When a page printer is provided it is preferably located above the tape roll 26, as indicated at P. It is supplied with wide paper from a paper roll 25, the paper being fed upward, as indicated at 29, and then forward over the top of the page printer P, and thence downward and around a direction-reversing roller 31, and thence upward out of the machine at 33. The paper is printed on its way up from the roller 31. The page printer P may be the same as that disclosed in Patent 2,942,065, previously mentioned. The entire assembly may be mounted on shock mounts, as suggested at 35.

THE PRINTER

Figure 7:
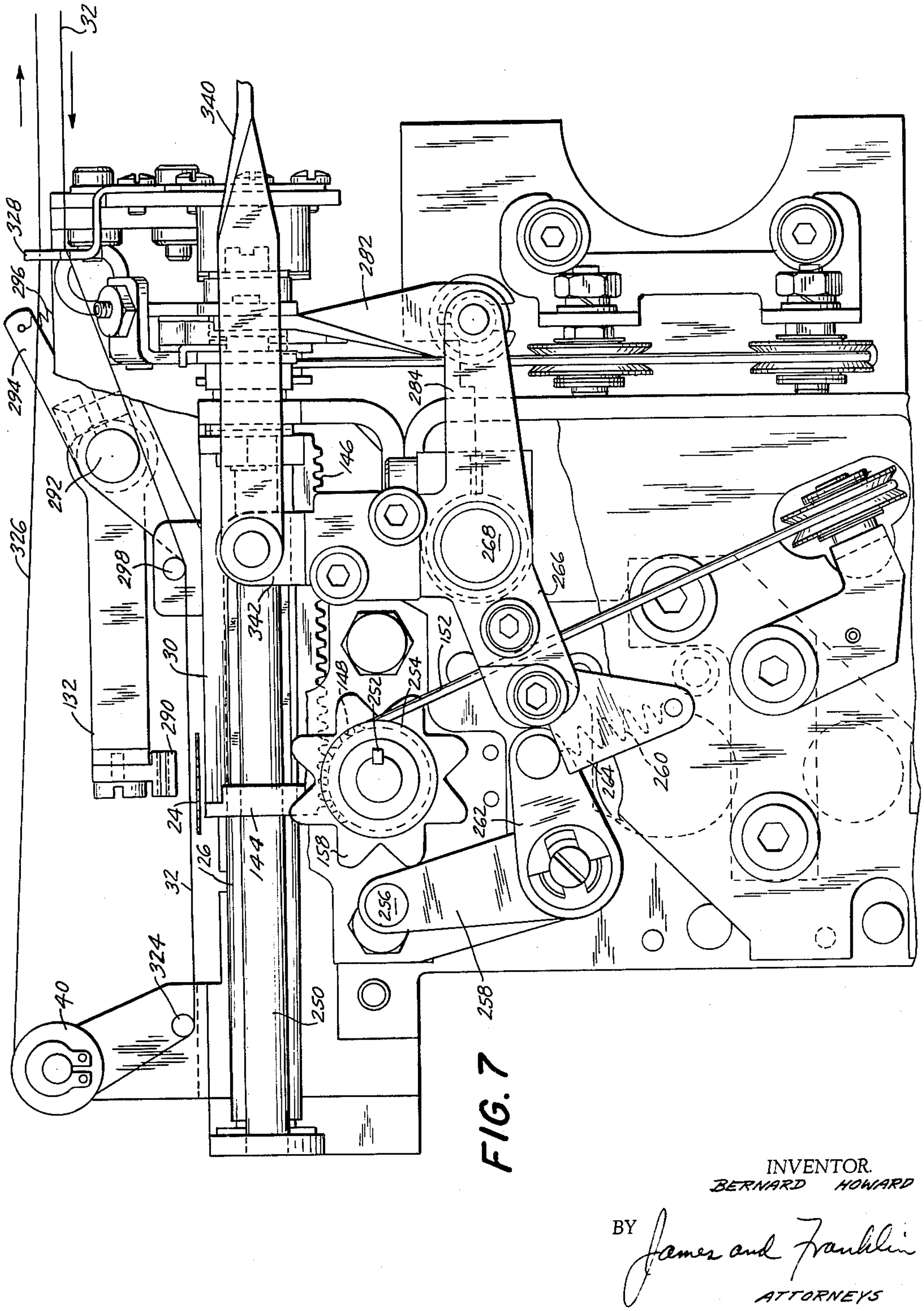
FIG. 7 is an end elevation of the printer.
Figure 8:
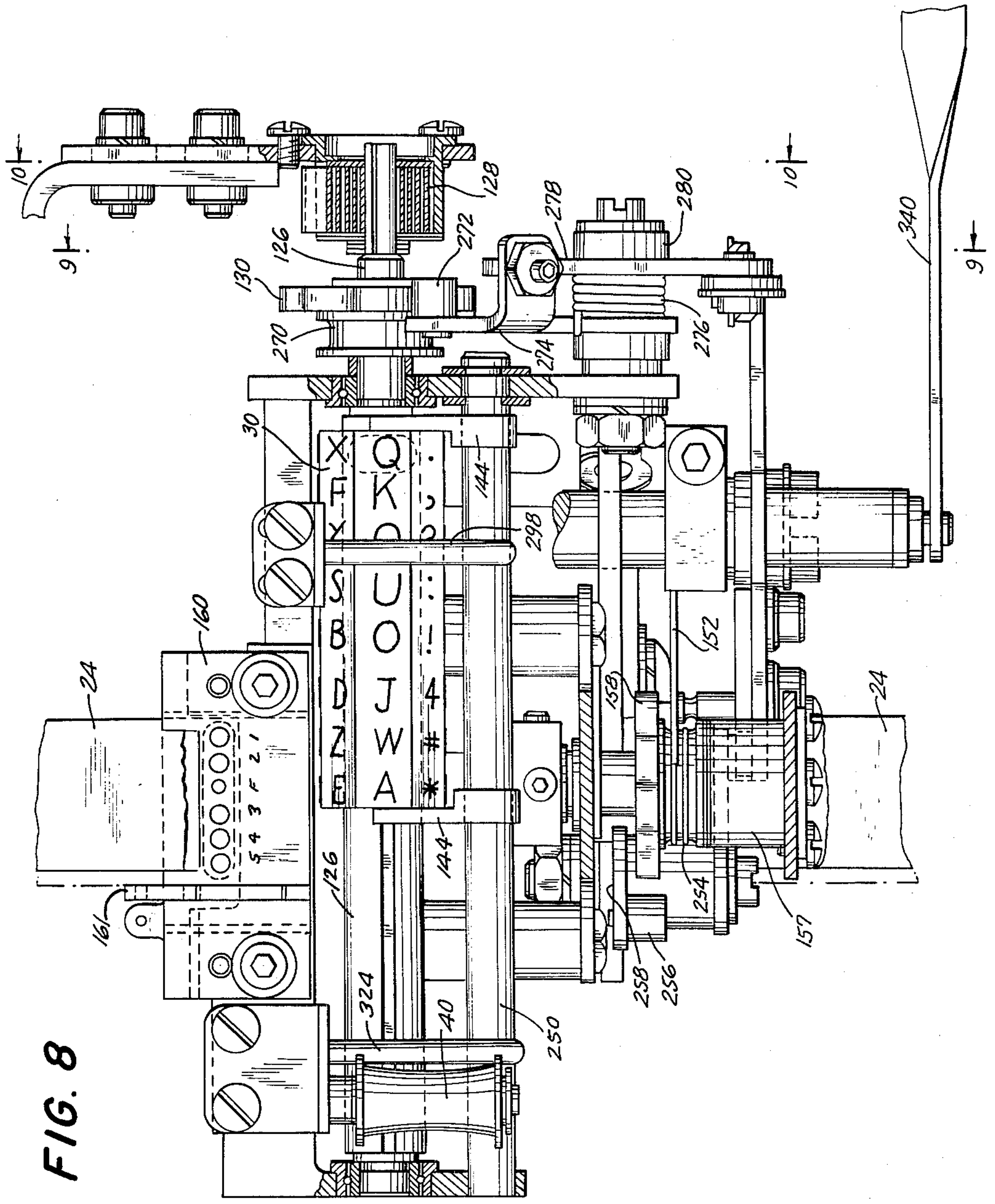
FIG. 8 is a plan view of the printer perforator.

Referring to FIG. 8 the tape is shown at 24, and the perforator at 160 (FIGS. 8 and 11), this having a row of punches disposed transversely of the tape. The printer comprises a type cylinder 30 (FIGS. 7 and 8) which is movable both axially and rotatably for character selection. The type cylinder is mounted with its axis transversely of the tape, and close to the die 160 of the perforator. The transverse position of the type cylinder makes possible the desired close juxtaposition of the perforator and the type cylinder.

The mechanism for axial selection of a type character may be described with reference to FIGS. 7 and 8 of the drawing. The type cylinder 30 in this case, as in Patent 2,942,065, is eight characters long and eight characters around, but the characters are turned 90° in orientation. The type cylinder is slidably keyed or splined to a shaft 126 which rotates the type cylinder. The latter is located between the arms of a yoke 144, and the latter is freely slidable along a guide rod 250. The yoke arms are rigidly connected to one another and are moved by a gear rack 146 (FIG. 7). This meshes with a gear 148 which is keyed at 252 to a shaft and drum 254 around which drum the cable 152 is wound. The cable acts against a spiral ribbon spring confined within and concealed by a housing 157 (FIG. 8). The rotating parts further include detent wheel 158 (FIG. 7) which has eight notches corresponding to the eight axial positions of the cylinder. A detent roller 256 is mounted on an arm 258, and is urged toward the detent wheel by a pull spring 260 acting on an arm 262 connected to arm 258, the said arms acting as an angle lever.

The detent 256 is held out by a stop 264 carried by an arm 266 mounted on a rock shaft 268. This shaft is rocked once for each character printed, and serves many purposes such as feeding the tape, feeding the ribbon, operating the perforator, etc. It corresponds to the special function rock shaft of the regular page printer mechanism described in Patent 2,942,065 (it being shaft 194 in that patent).

When stop 264 is moved downward, the detent 256 moves between two teeth of the detent wheel 158, thereby accurately fixing the axial position of the type cylinder. This is one important advantage of using a gear and rack mechanism between the selector cable 152 and the type cylinder, that is, it makes possible the use of a rotary detent wheel 158, separated from the yoke and type cylinder in respect to vibration.

Figures 9, 10:
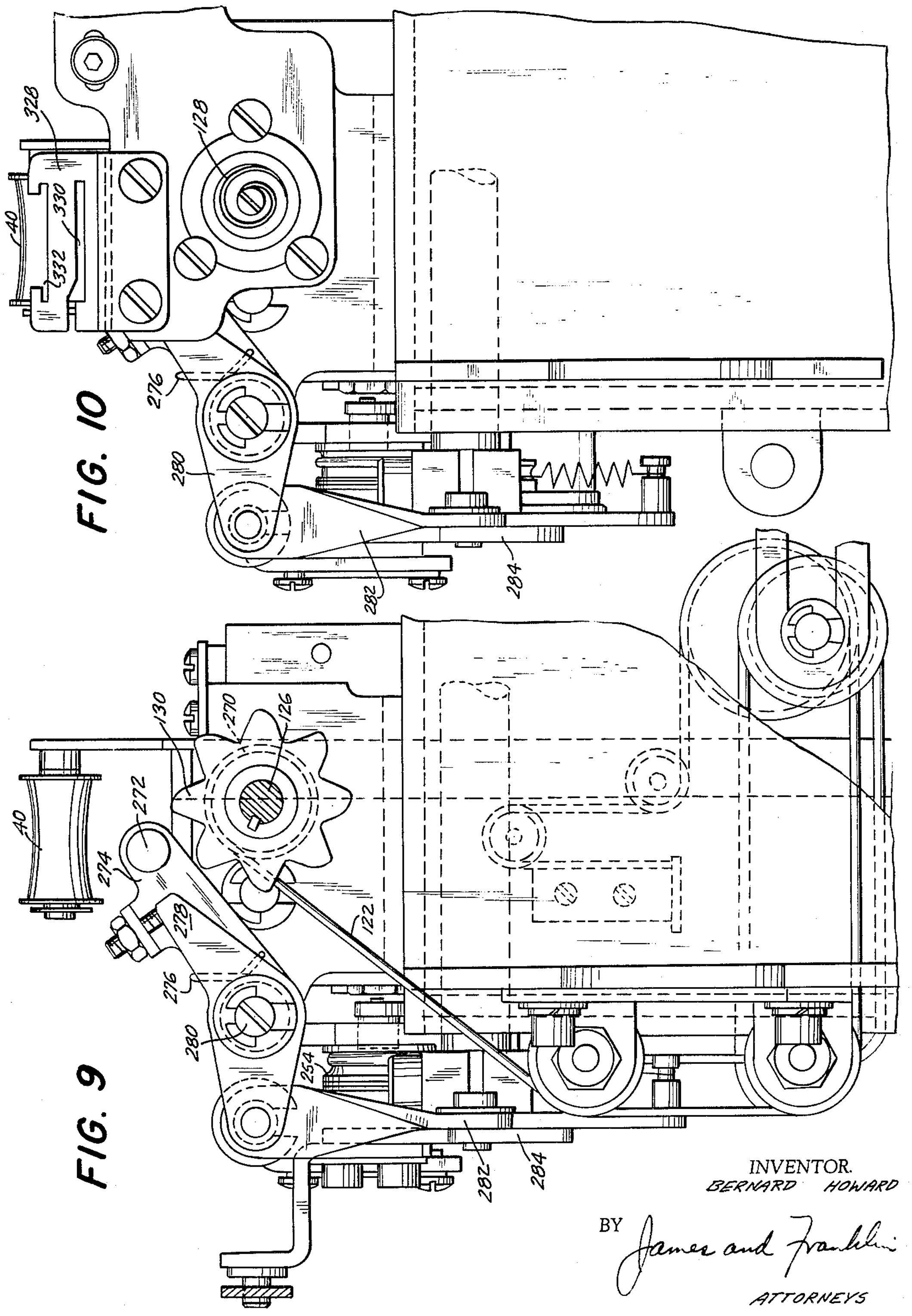
FIG. 9 is a partially sectioned rear elevation of the printer, taken approximately in the plane of the line 9—9 of FIG. 8.
FIG. 10 is a similar view, with the cable omitted, and taken approximately in the plane of the line 10—10 of FIG. 8.

The rotary selection may be described with reference to FIGS. 8, 9 and 10 of the drawing. The selector cable 122 (FIG. 9) is wound about a drum 270 (FIG. 8) keyed to the splined shaft 126. The cable works against a spiral ribbon spring 128, which may be housed within a cylindrical housing. The shaft 126 also carries a detent wheel 130. This cooperates with a detent roller 272 (FIG. 9) carried on an arm 274. The detent is urged inward by a helical spring 276, and is held outward by a rocker 278 pivoted at 280. The other arm of rocker 278 is operated by a generally upright link 282.

Reverting to FIG. 7, the link 282 is twisted 90° at its lower end, and is there pivotally connected to an arm 284 secured to the rock shaft 268 previously referred to. When the shaft rocks counterclockwise, the detents 256 and 272 are both released for spring pressed movement against their detent wheels, thereby fixing the type cylinder both axially and rotatably.

The action of the print hammer may be described with reference to FIGS. 7 and 13. The hammer head 290 is secured at the end of a hammer arm 132 which is pivoted at 292. Shaft 292 carries an arm 294 which is urged clockwise by a pull spring 296, thereby raising the hammer. The raised position is determined by a stop 298. Shaft 292 also carries an arm 300 (FIG. 13), and this is operated through linkage and a tripper or quick release mechanism leading down to a cam, a fragment of which is shown at 134. When a cam drop, indicated at 302 is reached, the cam follower 304 moves upward about its shaft 306. This carries an abutment surface 308 which bears against a generally upright link or pusher member 310, thereby operating arm 300, shaft 292, and with it the hammer 132.

Figure 13A:
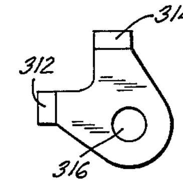
FIG. 13A shows a detail.

However, the parts 308 and 310 also cooperate with a small quick-release rocker or angle piece, having offsets 312 and 314 at the ends of its arms. The rocker is pivoted at 316. It is shown separately in FIG. 13A. The upward movement of part 308 (FIG. 13) raises rocker arm 312 which moves rocker arm 314 to the right, and at a desired point the lower end of pusher 310 is moved outward until it reaches the end of abutment 308, whereupon the hammer is free. It continues down by inertia to hit the ink ribbon (not shown) and paper 24 against the type sylinder 30. It then rises under influence of pull spring 296.

When rotating cam 134 again moves cam follower 304 outward, the sloping surface 318 at the end of abutment 308 moves the pusher 310 outward, to facilitate which the pusher is given a sloping surface at 320. When the abutment 308 comes to the end of the pusher the latter is pulled back into working position over the abutment 308 by its pull spring 322. This restoring movement also turns the quick-release rocker 312, 314 in counterclockwise direction about its pivot 316, so that the parts are all restored to the position shown in FIG. 13.

It will be understood that the paper tape is disposed over the print cylinder 30, as indicated at 24 in FIG. 7, and below the hammer head 290, and that the lower pass of the ink ribbon 32 is disposed between the paper tape and the hammer. The ink ribbon then is guided upward at 324 and at 40, the upper pass of the ink ribbon being indicated at 326. The ribbon is guided in a slotted guide 328, the configuration of which is clearly shown at the top of FIG. 10, there being a lower slot 330 for the lower pass, and an upper slot 332 for the upper pass of the ribbon. Both slots are open, to facilitate insertion of the ribbon.

The ribbon feed may be described briefly with reference to FIG. 3, but is not claimed herein, it being described in detail in my copending application filed June 20, 1962, under Ser. No. 203,768, now Patent No. 3,184,027, issued on May 18, 1965. Referring to FIG. 3, ribbon feed pawls 334 are carried on a rocker 336 which is pivoted at 338. This mechanism is operated by a generally horizontal link 340 which extends forward to an upright operating arm 342. Referring now to FIG. 7, the horizontal link 340 is connected to an upright arm 342 which is secured to rock shaft 268. It will be recalled that this shaft rocks once for each printing operation, and that it carries the arm 266 which works the detent for axial position, and carries the arm 284 which works the detent for rotary position, of the type cylinder. The third arm 342 is connected through link 340 to the ribbon feed mechanism.

THE PERFORATOR

Figures 16, 17, 18, 19, 20:
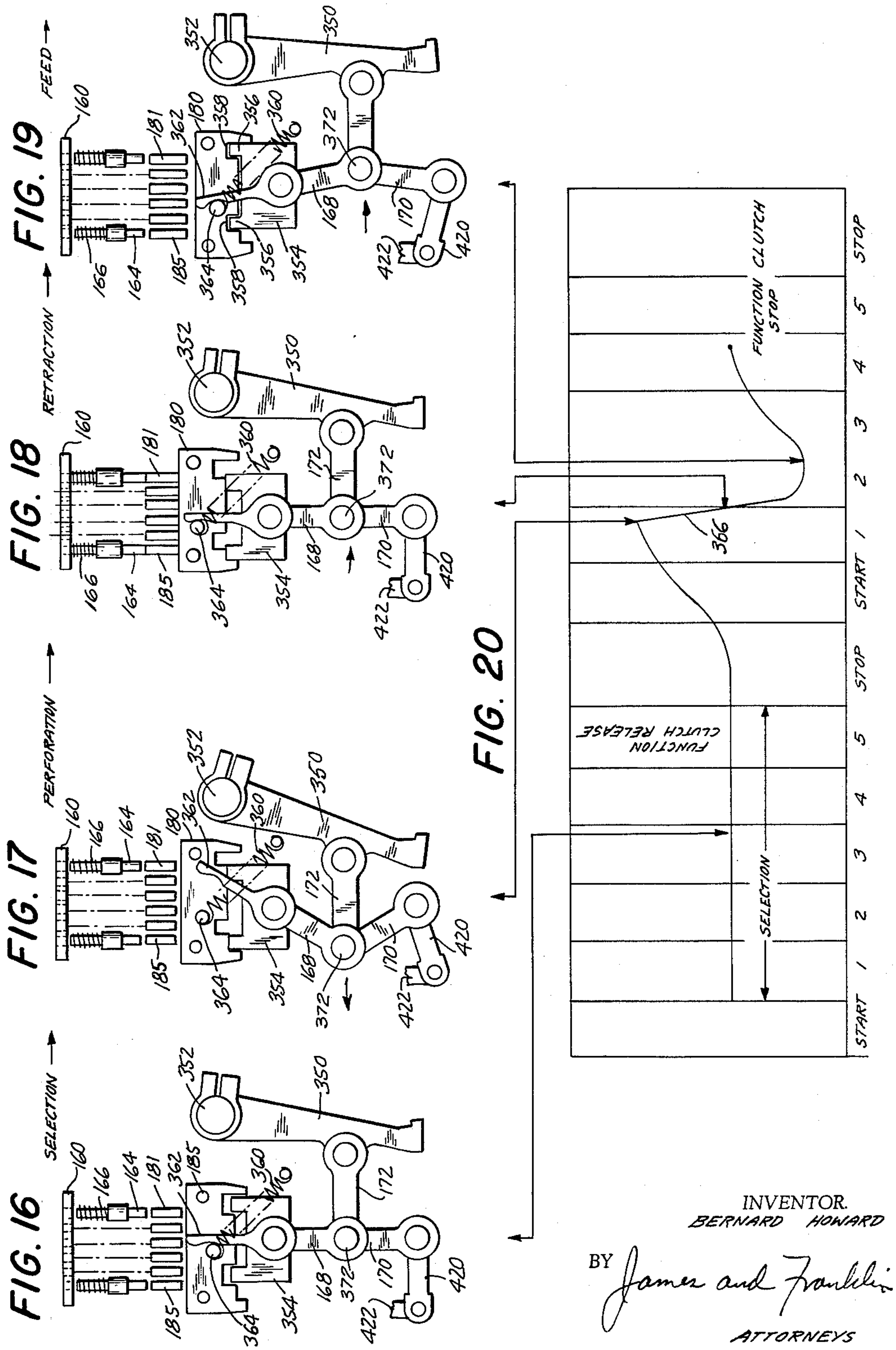
FIGS. 16–19 are similar elevations, with the toggle linkage drawn schematically in different positions, to help explain the operation of the same.
FIG. 20 is a time and motion diagram showing the operation of the perforating punches resulting from the toggle linkage shown in FIGS. 12 and 15–19.

The perforator may be described with preliminary reference to FIGS. 16 through 20 of the drawing, which are schematic rather than structural, but which illustrate the principle underlying the mechanism. In FIG. 17 the tape perforator comprises a stationary die 160 with a row of punches 164 therebeneath. The punches are normally urged downward by individual compression springs 166. They may be moved upward by a toggle linkage, as is illustrated by the change from FIG. 17 to FIG. 18, the toggle arms being 168 and 170 operated by a link 172. The toggle arms, when straightened, raise a plate 180 which is located beneath the row of punches. There are also individual selector interposers 181 through 185 which are movable in longitudinal direction, that is, at right angles to the drawing, to a position between the plate 180 and a punch, thereby causing selective operation of the same. The rise of plate 180 caused by the toggle arms, will lift a punch only if a selector interposer has been inserted between the plate 180 and the punch.

As so far described, the toggle arms would move from one side of center (FIG. 17) to the center position (FIG. 18), and then back again to the side position shown in FIG. 17. However, this would result in relatively slow retraction of the punches, and the present mechanism instead moves the toggle arms through and beyond center position, as shown in FIG. 19. On the way back the toggle is again straightened as shown in FIG. 16, but the punches are disabled because of a quick-release mechanism.

The link 172 is shown connected to the pusher arm 350 of the special function mechanism described in Patent 2,942,065. This pusher moves abruptly to the right once for each cycle or printing operation. In practice the link 172 is connected to a separate arm (131 in FIG. 15) which is secured to the shaft 352, rather than directly to the pusher as here shown. The punch mechanism is disabled during the return stroke of the pusher and toggle arms.

To accomplish this the toggle arms first operate a plate 354 beneath plate 180, and the latter acts as a main interposer which is shiftable relative to the plate 354. The main interposer shifts back and forth, and therefore may be called a shuttle interposer, or more conveniently, a shuttle, in order to distinguish this interposer from the individual selector interposers which then, for convenience, may be called the interposers, although in fact a punch is not operated unless both its selector interposer and the shuttle interposer are disposed between the pusher 354 and the punch. In FIGS. 17 and 18 the shuttle 180 is in its right-hand position and is effectively raised by the pusher 354. In FIG. 19 the shuttle 180 is in its left-hand position at which time projections 356 enter mating notches 358, thus dropping the shuttle to a lowered position relative to the pusher 354. In this lowered position, the punches are not raised, even when the toggle arms are straightened as shown in FIG. 16.

The shuttle 180 is normally urged toward the right by a pull spring 360. It may be moved to the left by shift means here illustrated as a finger 362 which is secured to toggle arm 168, and which bears against a pin 364 projecting from the shuttle 180.

FIG. 20 plots the resulting motion, and the abrupt withdrawal of the punches is illustrated by the sharp drop in the curve at 366. In practice, the punches are withdrawn in only say two milliseconds, resulting from the sharp drop of the shuttle 180 when disabled by shift finger 362, as shown in FIG. 19.

The use of toggle mechanism has important advantages in that the operation is forceful yet quiet and without the vibration and impact noise usually caused by a perforator. Toggle mechanism ordinarily would be considered to suffer from the disadvantage of slow action; long dwell in the raised position; and the need for accurate adjustment of the center or straight toggle position. These disadvantages are all overcome by the present mechanism in which the arms are moved right through center positon at any desired high speed, and in addition to which the punch retraction is further speeded by the abrupt disabling of the shuttle.

Figure 12:
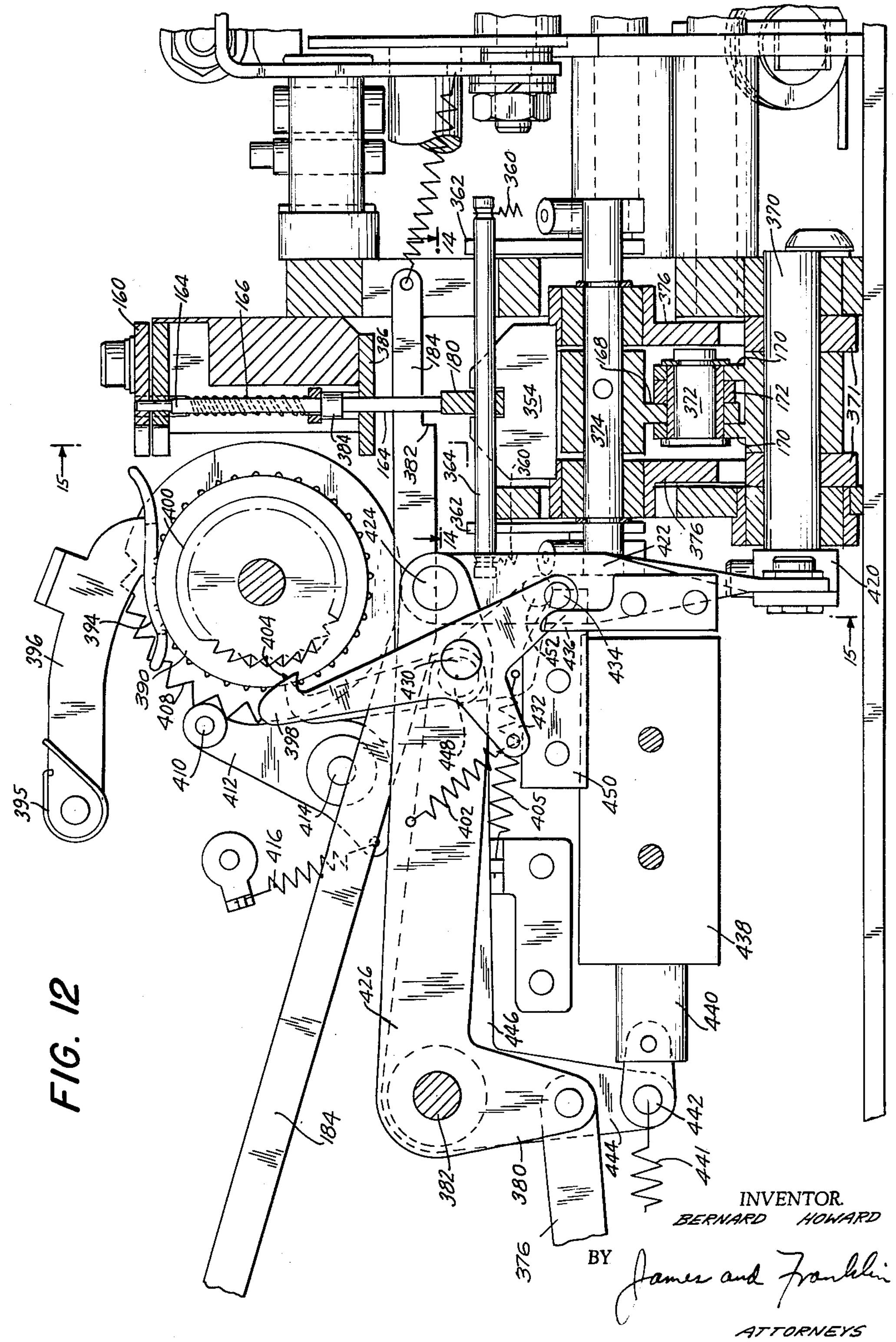
FIG. 12 is a vertical section through the perforator, the plane of the section being longitudinal of the paper tape, and being approximately in the plane of the stepped line 12—12 in FIG. 11.
Figures 13, 14:
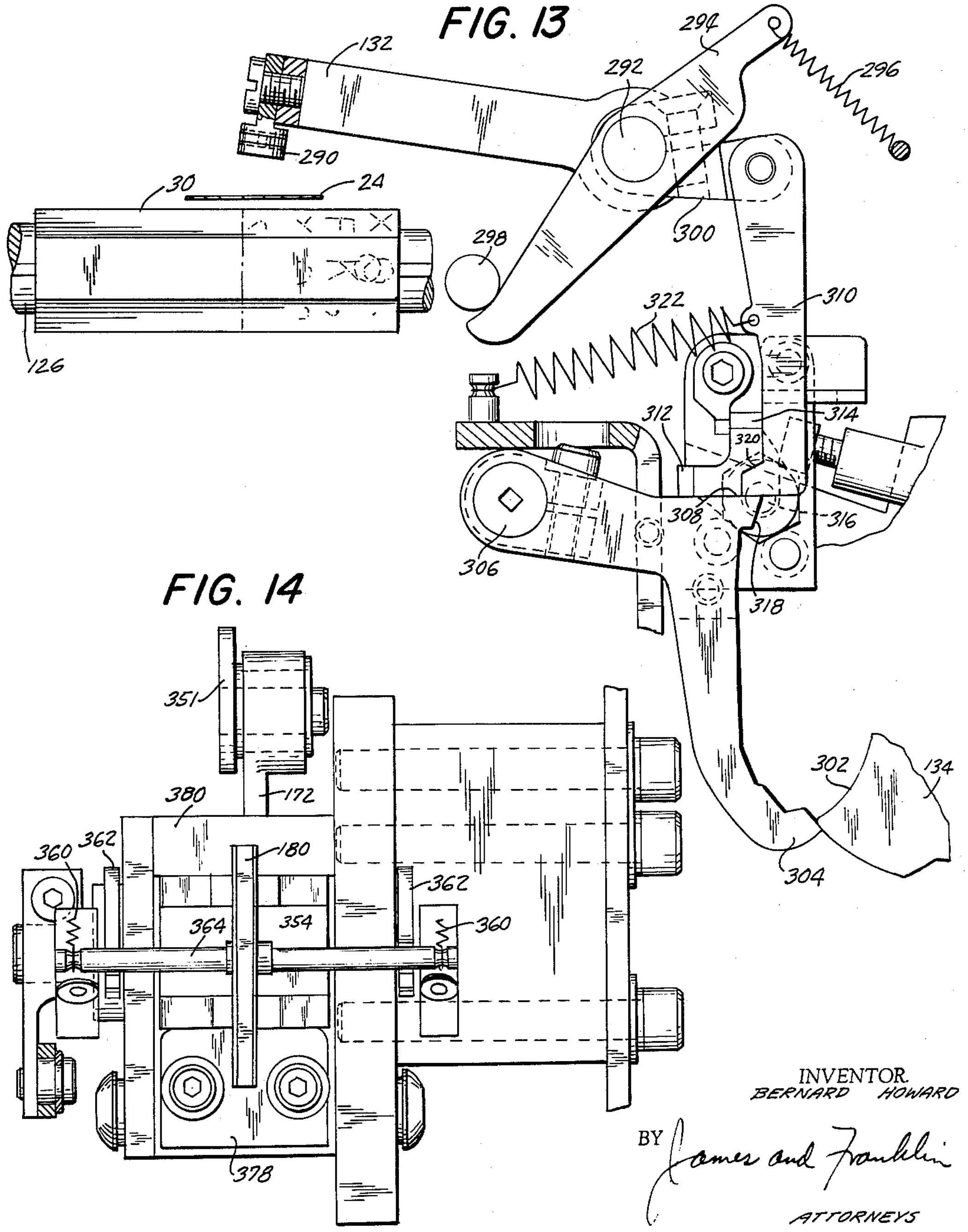
FIG. 13 is a partially sectioned fragmentary vertical section explanatory of the mechanism for operating the print hammer.
FIG. 14 is a plan view of the lower part of the perforator taken approximately in the plane of the line 14—14 of FIG. 12.
Figure 15:
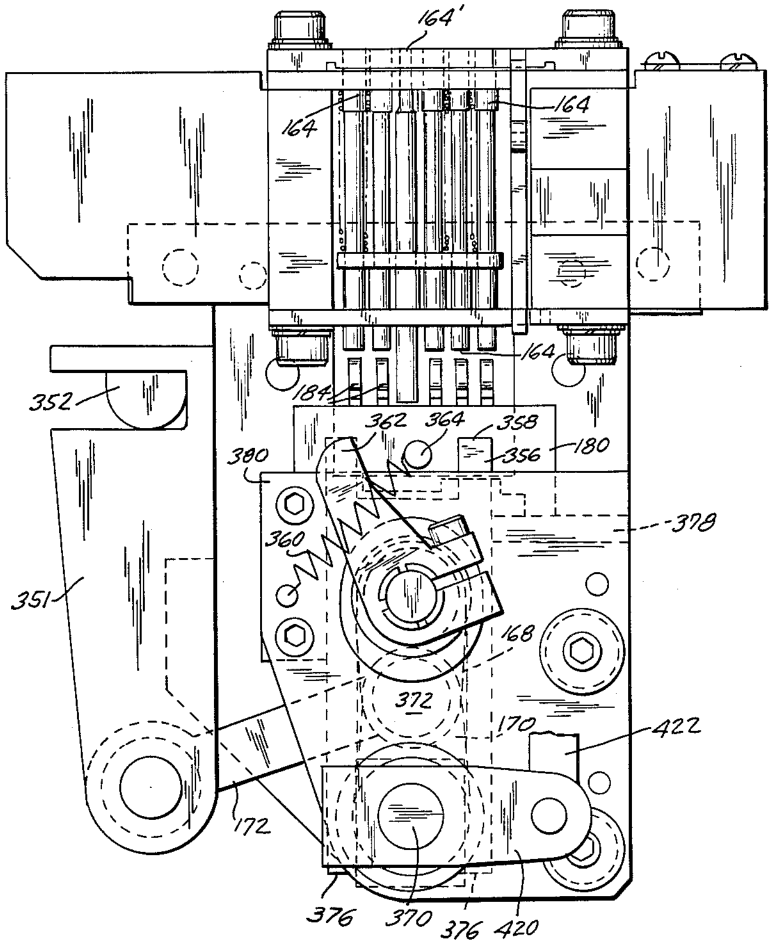
FIG. 15 is a vertical elevation of the perforator taken approximately in the plane of the stepped line 15—15 of FIG. 12.

Th actual structure of the toggle mechanism and perforator is shown in FIGS. 12, 14 and 15 of the drawing. In FIG. 12 it will be seen that the lower toggle arm 170 is a double arm fixed on a shaft 370 carried in stationary bearings. The pivot between the toggle arms is at 372. The link 172, as well as the upper toggle arm 168 both are located between the spaced lower toggle arms 170. The pin of the upper toggle arm is at 374, and this also carries deep pusher 376, the upper integral portion 354 of which corresponds to the plate or pusher 354 in FIGS. 16–19. The lower portion is bifurcated to straddle the shaft 370 (or more specifically bearing blocks 371) for guide purposes. The main or shuttle interposer is shown at 180. It is shifted by two fingers 362 which bear against a pin 364 which extends on both sides of the shuttle 180, the arrangement being symmetrical, with two pull springs 360 and two shift fingers 362.

FIG. 15 shows the rock shaft 352 with depending arm 351 for moving the link 172 which is connected to the junction pivot 372 of the toggle arms. The arm 351 corresponds in a general way to the pusher 350 shown in FIGS. 16–19, in that the arm 351 is connected to the same shaft 352.

The toggle mechanism is like that previously described except that many parts are symmetrical, and all are more ruggedly designed, with large hubs and bearings, and it is therefore more difficult to recognize the mechanism. For that reason FIGS. 16–19 have been presented in schematic form. The actual toggle mechanism is provided with anti-friction needle bearings, and the shuttle 180 slides on special hardened wear surfaces or blocks indicated in FIG. 14 at 378 and 380. These also guide the vertical movement of the pusher 354, 376.

Referring to FIG. 12, the shape of the working end of a selector interposer is shown at 184. It is stepped at 382, and the wider portion makes the punch operative. If the selector interposer is moved to the left the narrow portion makes the punch inoperative. There are five such interposers in the present case, for the five punches, corresponding to the holes marked 1–5 in FIG. 11. The third hole (from the top in FIG. 11 and from the left in FIG. 15) is of smaller diameter, and receives a punch which works at every punch stroke to produce feed holes for subsequent use with sprocket feed wheels.

Figure 11:
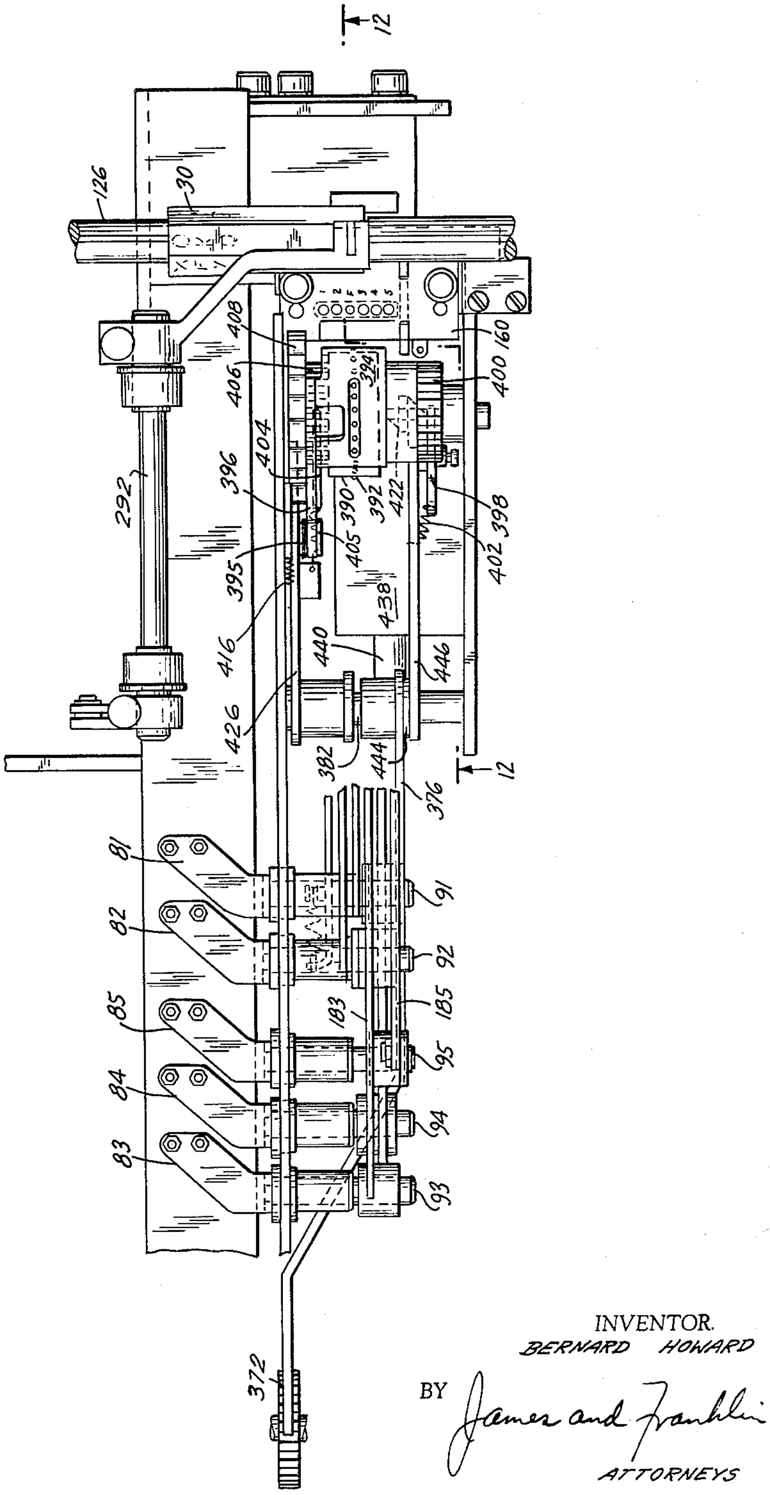
FIG. 11 is a fragmentary plan view showing the selector interposers of the perforator, this view being taken beneath the tape support and error marker.

From inspection of FIGS. 4, 11 and 12, it will be seen how the selector interposers extend leftward from the perforator to a position in front of the main selector. The interposers are there connected to the appropriate arms 101–105 (FIG. 4), the shafts 91 through 95 of which are oscillated by angle arms shown in FIG. 11 at 81 through 85. These are moved by upright pins connected to the selector pulleys of the selector described in Patent 2,942,065, and one of which is illustrated in FIG. 6 at 186. These pins are so adjusted as to provide lost motion in operating the angle levers, so that all of the selector interposers are moved the same amount, even though the vertical movements of the selector pulleys may differ.

The construction of the die and punches is shown in FIG. 12. The die preferably consists of upper and lower plates between which the tape is confined. The punch is enlarged at 384. This receives the lower end of the restoring spring 166. It also acts as a stop to limit the downward movement of the punch when the collar 384 reaches plate 386.

The particular punch shown in FIG. 12 is the feed hole punch, and therefore is longer at the bottom, so that no interposer like 184 is needed. Also it is smaller in diameter at the top. A regular punch, when raised as shown, would rest at its lower end on an interposer, and its upper end would have the larger diameter, as indicated by contrast in FIG. 15 in which only the feed hole punch 164' is reduced in diameter, compared to the five regular punches. In this way clearance is maintained for free movement of the selector interposers, and the other parts of the mechanism, except during actual operation of a punch.

For multiple width tapes retractable guide plates may be employed, and referring to FIG. 8, one such guide plate is shown at 161. This guide plate is raised for a narrow tape, and lowered for a wide tape. If three tape widths are to be accommodated, two such retractable plates may be employed. I have made such a machine which accepts tapes of 11/16 inch, 7/8 inch, and one inch width.

TAPE FEED MECHANISM

Referring to FIGS. 11 and 12 the paper tape following the perforator passes over and is fed by a feed roller 390 which has sprocket pins 392 which fit in the sprocket holes formed in the tape by the perforator. The paper may be held against the feed roller by a suitable pressure foot 394 carried on an arm 396. The arm 396 of the shoe 394 is urged downward by a torsion spring indicated at 395. The arm and shoe may be turned up out of the way manually when starting a new tape.

The feed roller is moved intermittently by a feed pawl 398 urged toward ratchet wheel 400 by a pull spring 402. There is also a back space pawl 404 which may cooperate with another ratchet wheel indicated at 406 in FIG. 11. The pawl 404 has a spring 405. The ratchet wheels are on opposite ends of the feed roller 390, and have oppositely facing teeth.

The stop position of the feed roller may be additionally fixed by means of a detent wheel 408 cooperating with a detent roller 410 carried on an arm 412, pivoted at 414, and urged toward the detent wheel by means of a pull spring 416.

The motion of the feed dog 398 is obtained as follows. In FIG. 12 the bottom shaft 370 of the toggle carries an arm 420. This is also shown in FIG. 15. Arm 420 operates an upright link 422 which is twisted ninety degrees, and the upper end of which is connected at 424 to a relatively long horizontal arm 426 pivoted on a stationary pin at 382. The forward feed dog 398 is connected to the horizontal arm 426 at 430, and thus moves up and down with arm 426 and the twisted upright link 422. The spring 402 of the feed pawl is connected to an offset or angle arm 432. The feed movement or down stroke takes place during the return movement of the toggle, corresponding to the change from FIG. 19 to FIG. 16.

During the latter part of the down travel of the feed pawl it is disengaged because it is moved outward. This takes place when a pin 434 on its downward extension bears against a stationary cam plate 436 which moves pin 434 to the right and therefore moves the tooth 398 to the left, as shown in FIG. 12.

The detent arm 412 requires no operating linkage because the detent roller 410 is simply cammed in and out by the teeth of the detent wheel itself.

The back space pawl 404 is preferably moved electrically under remote control. This is done in order that it may be controlled from a "back space" key on the keyboard, so that the operator, on making a mistake, can back space and then press the "letters" key, thereby operating all punches and obliterating the incorrect holes as a character. The operator then continues with the key for the correct character originally intended.

The said electrical operation is obtained by means of a solenoid 438, the core 440 of which is connected at 442 to an arm 444 on a short horizontal shaft or sleeve which also carries a generally horizontal arm 446, the arms 444 and 446 then acting as an angle lever. The movable end of arm 446 is connected at 448 to the back space pawl 404. Core 440 is returned by spring 441.

The back space pawl 404 is urged into engagement by pull spring 405. It is moved out of engagement, against the action of spring 405, by the right end of a stationary cam plate 450 cooperating with a pin 452 carried on a downward extension of back-space pawl 404. This is done so that the back space pawl is normally kept out of engagement with its ratchet wheel, in order not to interfere with the normal forward feed movement caused by the feed pawl 398.

The forward feed at the perforator is carried synchronously to the remote forward feed roller 372 shown in FIG. 4. The ratchet wheel of roller 372 is turned by a long feed pawl 376. Its right end is connected to an upright arm 380 (FIG. 12), the upper end of which is secured to the generally horizontal arm 426, which it will be recalled is oscillated by the upright link 422 in order to move the feed pawl 398. Both feed pawls therefore move in unison and in proper feed direction, and the parts are so proportioned that the two feeds are equal in amount.

It is believed that the construction and operation, as well as the advantages of my improved tape printer and perforator with reader, will be apparent from the foregoing detailed description. It will also be apparent that while I have shown and described my invention in a preferred form, changes may be made without departing from the scope of the invention, as sought to be defined in the following claims.

In the specification and claims the reference to an incoming or outgoing telegraph line is not intended to exclude other types of signal channel, typically a radio telegraph channel. The reference to the pusher and interposers being beneath the punches is for convenience in visualization, but is intended in a relative rather than an absolute sense, because they could be disposed above the punches with the punches operating downward through the tape instead of upward, as here preferred, or the punches could be at an angle instead of vertical. The reference to the type cylinder being slidable on a splined shaft includes a keyed shaft or a square shaft.

I claim:

1. A code tape perforator comprising a die, a row of punches reciprocable through said die, a pusher beneath said punches, a toggle linkage to operate the pusher, drive means operating said toggle mechanism from one side position through its center position to the other side and back again, whereby the toggle is straightened twice for each operation of the drive means, a shuttle above said pusher, shift means between said toggle linkage and said shuttle to shift the shuttle between a punch operating position when the toggle is being straightened in one direction and a disabling position when the toggle is being straightened in opposite direction, and selector interposers movable between said shuttle and the individual punches to cause selective operation of the punches when the shuttle is in punch operating position.

2. A code tape perforator as defined in claim 1, in combination with a tape printer, said printer comprising an elongated type body movable longitudinally for character selection, said perforator die and said row of punches being disposed transversely of the tape, said stype body bing mounted with its long axis transversely of the tape and close to the die, the transverse position of the type body making possible the desired close juxtaposition of the perforator and the type body.

3. A code tape perforator as defined in claim 1, in combination with a tape printer, said printer comprising a relatively long type cylinder of small diameter movable axially and rotatably for character selection, said perforator die and said row of punches being disposed transversely of the tape, said type cylinder being mounted with its axis transversely of the tape and close to the die, the transverse position of the type cylinder making possible the desired close juxtaposition of the perforator and the type cylinder.

4. A code tape perforator as defined in claim 1, further comprising tape feed means including a feed roller, a ratchet wheel, a pawl for engaging the ratchet wheel, an arm secured to a toggle arm for movement therewith, and linkage so connecting said arm to said feed pawl as to feed the tape during the return stroke of the toggle linkage.

5. A code tape perforator comprising a code-pulse-responsive selector including a special function device having a fast moving arm which operates once for each character, a die, a row of punches reciprocable through said die, a pusher beneath said punches, a toggle linkage to operate the pusher, drive means operating said toggle mechanism from one side position through its center position to the other side and back again, whereby the toggle is straightened twice for each operation of the drive mans, a shuttle above said pusher, shift means between said toggle linkage and said shuttle to shift the shuttle between a punch operating position when the toggle is being straightened in one direction and a disabling position when the toggle is being straightened in opposite direction, selector interposers movable by said selector between said shuttle and the individual punches to cause selective operation of the punches when the shuttle is in punch operating position, and means connecting said fast moving arm to the toggle linkage to operate the same once for each character.

6. A code tape perforator as defined in claim 5, further comprising tape feed means including a feed roller, a ratchet wheel, a pawl for engaging the ratchet wheel, an arm secured to a toggle arm for movement therewith, and linkage so connecting said arm to said feed pawl as to feed the tape during the return stroke of the toggle linkage.

7. A code tape perforator comprising a die, a row of punches reciprocable through said die, a pusher beneath said punches, upper and lower toggle arms to operate the pusher, drive means operating said toggle mechanism from one side position through its center position to the other side and back again, whereby the toggle is straightened twice for each operation of the drive means, a shuttle above said pusher, a shift finger secured to move with the upper toggle arm and to bear against said shuttle to shift the shuttle between a punch operating position which it has when the toggle is being straightened in one direction and a disabling position which it has when the toggle is being straightened in opposite direction, and selector interposers movable between said shuttle and the individual punches to cause selective operation of the same when the shuttle is in punch operating position.

8. A code tape perforator as defined in claim 7, further comprising tape feed means including a feed roller, a ratchet wheel, a pawl for engaging the ratchet wheel, an arm secured to a toggle arm for movement therewith, and linkage so connecting said arm to said feed pawl as to feed the tape during the return stroke of the toggle linkage.

9. A code tape perforator comprising a code-pulse-responsive selector including a special function device having a fast moving arm which operates once for each character, a die, a row of punches reciprocable through said die, a pusher beneath said punches, upper and lower toggle arms to operate the pusher, drive means operating said toggle mechanism from one side position through its center position to the other side and back again, whereby the toggle is straightened twice for each operation of the drive means, a shuttle above said pusher, a shift finger secured to move with the upper toggle arm and to bear against said shuttle to shift the shuttle between a punch operating position which it has when the toggle is being straightened in one direction and a disabling position which it has when the toggle is being straightened in opposite direction, selector interposers movable by said selector between said shuttle and the individual punches to cause selective operation of the same when the shuttle is in punch operating position, and means connecting said fast moving arm to the toggle linkage to operate the same once for each character.

10. A code tape perforator as defined in claim 9, further comprising tape feed means including a feed roller, a ratchet wheel, a pawl for engaging the ratchet wheel, an arm secured to a toggle arm for movement therewith, and linkage so connecting said arm to said feed pawl as to feed the tape during the return stroke of the toggle linkage.

11. A code tape perforator comprising a die, a row of punches reciprocable through said die, a pusher beneath said punches, a toggle linkage to operate the pusher, drive means operating said toggle mechanism from one side position through its center position to the other side and back again, whereby the toggle is straightened twice for each operation of the drive means, a shuttle above said pusher, selector interposers movable between said shuttle and the individual punches to cause selective operation of the same when the shuttle is in punch operating position, and shift means between said toggle linkage and said shuttle to shift the shuttle from a punch operating position which it has when the toggle is being straightened in one direction to a non-operating position when the toggle has moved past the center position in order to produce quick retraction of the punches.

12. A code tape perforator comprising a code-pulse-responsive selector including a special function device having a fast moving arm which operates once for each character, a die, a row of punches reciprocable through said die, a pusher beneath said punches, a toggle linkage to operate the pusher, drive means operating said toggle mechanism from one side position through its center position to the other side and back again, whereby the toggle is straightened twice for each operation of the drive means, a shuttle above said pusher, selector interposers movable by said selector between said shuttle and the individual punches to cause selective operation of the same when the shuttle is in punch operating position, means connecting said fast moving arm to the toggle linkage to operate the same once for each character, and shift means between said toggle linkage and said shuttle to shift the shuttle from a punch operating position which it has when the toggle is being straightened in one direction to a non-operating position when the toggle has moved past the center position in order to produce quick retraction of the punches.

13. A tape printer comprising a type cylinder axially slidable on a splined shaft extending transversely of the tape, a yoke for sliding the type cylinder axially on the splined shaft, a gear rack mounted directly on said yoke, a gear meshing with said rack, a selector cable, selector means to effectively lengthen or shorten the cable in order to rotate the gear for axial selection of a character, a detent wheel secured to and rotating with said gear, and associated detent mechanism bearing resiliently against said detent wheel to help fix the axial position of the type cylinder.

14. A tape printer comprising a type cylinder axially slidable on a splined shaft extending transversely of the tape, a selector cable, selector means to effectively lengthen or shorten the cable in order to rotate the shaft for rotary selection of a character, a detent wheel and associated detent mechanism bearing resiliently against said detent wheel to help fix the rotary position of the type cylinder, a yoke for sliding the type cylinder axially on the splined shaft, a gear rack mounted directly on said yoke, a gear meshing with said rack, a selector cable, selector means to effectively lengthen or shorten the cable in order to rotate the gear for axial selection of a character, a detent wheel secured to and rotating with said gear, and associated detent mechanism bearing resiliently against said detent wheel to help fix the axial position of the type cylinder.

15. A combination tape printer and perforator, said printer comprising an elongated type body movable longitudinally for character selection, said perforator comprising a die and a row of punches disposed transversely of the tape, said type body being mounted with its long axis transversely of the tape and close to the die, the transverse position of the type body making possible the desired close juxtaposition of the perforator and the type body, a tape reader spaced well away from said printer perforator to enable display of a substantial section of tape therebetween, and an error marker slidable along the displayed section of tape to mark the location of an error.

16. A combination tape printer and perforator, said printer comprising a relatively long type cylinder of small diameter movable axially and rotatably for character selection, said perforator comprising a die and a row of punches disposed transversely of the tape, said type cylinder being mounted with its axis transversely of the tape and close to the die, the transverse position of the type cylinder making possible the desired close juxtaposition of the perforator and the type cylinder, a tape reader spaced well away from said printer perforator to enable display of a substantial section of tape therebetween, and an error marker slidable along the displayed section of tape to mark the location of an error.

17. A combination tape printer and perforator, said printer comprising an elongated type body movable longitudinally for character selection, said perforator comprising a die and a row of punches disposed transversely of the tape, said type body being mounted with its long axis transversely of the tape and close to the die, the transverse position of the type body making possible the desired close juxtaposition of the perforator and the type cylinder, a tape reader spced from said printer perforator, tape feed means at the printer perforator operated in synchronism therewith, tape feed means at the reader operated in synchronism therewith, and a tape feed means just ahead of the reader connected to and operated in synchronism with the printer perforator, whereby a slack loop of tape may be provided between the printer perforator and the reader.

18. A combination tape printer and perforator, said printer comprising a relatively long type cylinder of small diameter movable axially and rotatably for character selection, said perforator comprising a die and a row of punches disposed transversely of the tape, said type cylinder being mounted with its axis transversely of the tape and close to the die, the transverse position of the type cylinder making possible the desired close juxtaposition of the perforator and the type cylinder, a tape reader spaced from said printer perforator, tape feed means at the printer perforator operated in synchronism therewith, tape feed means at the reader operated in synchronism therewith, and a tape feed means just ahead of the reader connected to and operated in synchronism with the printer perforator, whereby a slack loop of tape may be provided between the printer perforator and the reader.

References Cited by the Examiner

UNITED STATES PATENTS

| | | | |
|---|---|---|---|
| 1,923,273 | 8/1933 | MacCoy | 178—28 |
| 2,174,731 | 10/1939 | Dirkes et al. | 178—92 |
| 2,192,352 | 3/1940 | Kleinschmidt | 178—92 |
| 2,323,932 | 7/1943 | Potts | 178—28 |
| 2,456,740 | 12/1948 | Schuler | 178—92 |
| 2,490,608 | 12/1949 | Zenner | 178—92 |
| 2,545,198 | 3/1951 | De Boo | 178—92 |
| 2,892,031 | 6/1959 | Arko et al. | 178—92 |
| 3,022,376 | 2/1962 | Howard | 178—17 |

FOREIGN PATENTS

| | | |
|---|---|---|
| 753,963 | 1/1953 | Germany. |
| 761,352 | 3/1954 | Germany. |

NEIL C. READ, *Primary Examiner.*

ROBERT H. ROSE, *Examiner.*

A. J. DUNN, T. A. ROBINSON, *Assistant Examiners.*